United States Patent [19]

Yoneda et al.

[11] Patent Number: 5,314,731
[45] Date of Patent: May 24, 1994

[54] SURFACE-TREATED SUBSTRATE

[75] Inventors: Takashige Yoneda; Tsuneo Wakabayashi; Yukiko Takano, all of Yokohama, Japan

[73] Assignee: Asahi Glass Company Ltd., Tokyo, Japan

[21] Appl. No.: 883,391

[22] Filed: May 15, 1992

[30] Foreign Application Priority Data

| May 17, 1991 | [JP] | Japan | 3-141413 |
| May 17, 1991 | [JP] | Japan | 3-141414 |
| May 17, 1991 | [JP] | Japan | 3-141415 |
| May 17, 1991 | [JP] | Japan | 3-141416 |
| Nov. 20, 1991 | [JP] | Japan | 3-331367 |

[51] Int. Cl.$^5$ .................................. B32B 9/00
[52] U.S. Cl. .................................. 428/429; 428/447; 428/448
[58] Field of Search .................. 428/429, 447, 448

[56] References Cited

FOREIGN PATENT DOCUMENTS 59-26944 2/1984 Japan .................. 428/429
3-149285 6/1991 Japan .

OTHER PUBLICATIONS

Chemical Abstracts, AN 27376t, vol. 101, No. 4, Jul. 1984, p. 231, "Low-Reflectivity Glass".
Chemical Abstracts, AN 229299t, vol. 104, No. 26, Jun. 1986, p. 279, H. Matsuo, et al., "Glass Having Low Reflectivity".
Database WPIL, 1988, Derwent Publications, Ltd., AN 88-115470, & JP-A-63 061 057, Mar. 17, 1988, "MFG. Surface-Hydrophobic Inorganic Material to Strengthen Resins-by Treating Inorganic Substances with Silyl Isocyanate(s) and Hydrophobic CPDS. Contg. at Least One of Silanol, Hydroxy GPS. etc.".
Database WPIL, 1990, Derwent Publications, Ltd., AN 90-251019, & JP-A-2 175 630, Jul. 6, 1990, "Prevention of Elution of Alkali by Metal Oxide Treating-of Internal Surface of Glass Production by Contacting Gasified Dispersion of Silyl Tetra:Isocyanate Mist With Glass".
Chemical Abstracts, AN 90250s, vol. 100, No. 12, Mar. 1984, p. 281, "Surface Treating Agents For Glasses".
Database WPIL, 1984, Derwent Publications, Ltd., AN 84-072033, & JP-A-59 026 944, Feb. 13, 1984, "Low Reflection Glass Used For Window Pane-Is Glass Coated With Silane Coupling Agent Then With Thin Film of Silane Cpd. Contg. Poly:Fluoro:Alkyl Radical".

Primary Examiner—John C. Bleutge
Assistant Examiner—Mark Sweet
Attorney, Agent, or Firm—Oblon, Spivak, McClelland, Maier & Neustadt

[57] ABSTRACT

A surface-treated substrate consisting essentially of a substrate having at least two treated surface layers wherein the first layer constituting the outermost layer among the treated surface layers is a layer obtained by treatment with a compound (I) capable of forming a surface having a contact angle of at least 70° against water and the second layer constituting an underlayer in contact with the outermost layer is a layer obtained by treatment with at least one reactive silane compound (II) selected from the group consisting of isocyanate silane compounds and hydrolyzable silane compounds.

20 Claims, No Drawings

… (1)

SURFACE-TREATED SUBSTRATE

FIELD OF THE INVENTION

The present invention relates to a substrate having a surface on which water drops scarcely attach or from which attached water drops can easily be removed.

BACKGROUND OF THE INVENTION

Various substrates or various substrates having treated surface layers are used in various fields, and adverse effects brought about by water to the surface of such substrates are problematic.

For example, in transportation equipments such as electric cars, automobiles, ships or aircrafts, the surface of an exterior part such as an outer panel, a window glass, a mirror or a display surface material, an interior part such as an instrument panel, or other articles, is desired to be always clean. If rain drops, dusts or soils become attached, or moisture is condensed due to the temperature or humidity in the air, on the surface of an article in a transportation equipment, the outer appearance will be impaired. If such is a surface which is directly visually observed or a surface which is directly touched by a person, it may give an unpleasant feeling or may create a hygienic problem. Further, such may bring about a deterioration of the inherent function which the article for a transportation instrument has. Especially in a case where the article for the transportation equipment is an article for which transparency or see-through property is required (such as a window glass or a mirror), a deterioration of the transparency or see-through property may mean that the purpose intended by the article can not be attained, and may cause a serious accident.

A means to remove water drops (such as removal by wiping off or by means of a wiper) may sometimes impart fine scratch marks on the surface. Further, such scratch marks may sometimes be widened by foreign particles accompanying water drops. Furthermore, it is well known that when moisture is attached to a glass surface, glass components are likely to elute into the moisture, whereby the surface will be eroded, thus leading to so-called scorching. If the surface is strongly polished or abraded to remove this scorching, a fine roughness is likely to form. At the see-through portion made of glass having substantial scorching or a fine roughness on its surface, its basic function is lowered, and scattering of light on its surface is substantial, whereby it tends to be difficult to secure the field of view, and consequently there will be a problem in securing the safety.

Further, moisture is likely to hazardous by influence the surface of an article for a transportation instrument and to promote damage, soiling, yellowing or corrosion. Otherwise, it may induce a change in the electrical characteristics, the mechanical properties or the optical properties of the article for a transportation equipment. The adverse effects of this type brought by water are problematic not only in the field of articles for transportation equipments but also in various fields including articles for building or building decoration or articles for electric or electronic equipments.

Under these circumstances, it is desired to impart to the substrate surface a characteristic such that water drops scarcely attach to the substrate surface or attached water drops can easily be removed (such a characteristic will hereinafter be referred to simply as a water drop removal property). Heretofore, to impart a water drop removal property to a surface, surface treating agents for direct application, such as a surfactant and a silicone oil made of silicone wax or organo polysiloxane, have been proposed.

However, such surface treating agents require pretreatment for application in many cases, and have a problem that nonuniformity in application is likely to occur. Further, the adhesive properties of such treating agents to the substrates are rather poor, whereby the durability of the water drop removal property has been inadequate, and the application range has been rather limited.

When the influence of moisture is taken into consideration, it is necessary to establish a measure not only for various substrates to be produced in the future but also for various substrates already being used. In this case, it is necessary to impart the water drop removal property simply by direct application to various substrates at normal temperatures. For example, when a case is taken into account wherein such treatment is to be applied to an automobile front glass already being used, it is not economical to replace the front glass of every automobile, or it is not practical to conduct baking after the application. Also from such an aspect, it is practically difficult to solve the problems by the conventional treating agents.

The present invention has been accomplished in view of the above problems. Namely, during the course of the research and study for a treating agent which is capable of solving the drawbacks inherent to the conventional treating agents, the present inventors have found a treating agent which is applicable to various types of substrates and which exhibits an excellent water drop removal property, and have confirmed that various substrates treated by such a treating agent are suitable for use as substrates having a water drop removal property, particularly for transportation equipments or for building and building decoration. The present invention has been completed on the basis of these discoveries.

SUMMARY OF THE INVENTION

Accordingly, it is an object of the present invention to provide a substrate having a water drop removal property, whereby such an effect lasts semipermanently with excellent abrasion resistance, chemical resistance and weather resistance.

The above object can be accomplished by the present invention which provides a surface-treated substrate consisting essentially of a substrate having at least two treated surface layers wherein the first layer constituting the outermost layer among the treated surface layers is a layer obtained by treatment with a compound (I) capable of forming a surface having a contact angle of at least 70° against water and the second layer constituting an underlayer in contact with the outermost layer is a layer obtained by treatment with at least one reactive silane compound (II) selected from the group consisting of isocyanate silane compounds and hydrolyzable silane compounds.

DETAILED DESCRIPTION OF THE PREFERRED EMBODIMENTS

Now, the present invention will be described in detail with reference to the preferred embodiments.

In the present invention, the compound (I) capable of forming a surface having a contact angle of at least 70° against water (hereinafter sometimes referred to simply as the compound (I)) is a component essential to provide the water drop removal property, and there is no particular restriction as to the structure of the compound (I). However, the one having a reactive group is preferred, when the adhesion to the second layer which will be described hereinafter, is taken into consideration. Here, the reactive group means e.g. a functional group such as a halogen group, an alkoxy group, an acyloxy group, an alkoxy-substituted alkoxy group, an aminoxy group, an amide group, an acid amide group, a ketoxymate group, a hydroxyl group, a mercapto group, an epoxy group, a glycidyl group, an unsaturated hydrocarbon group such as a vinyl group or an allyl group, or a carboxyl group, or a functional group having atoms capable of forming a hydrogen bond (such as oxygen atoms or nitrogen atoms).

The compound (I) has at least one hydrophobic organic group, since it is required to be a compound capable of forming a surface having a contact angle of at least 70° against water. As such a hydrophobic organic group, a long chain hydrocarbon group or an organic group having fluorine atoms is, for example, suitable. A polyfluoroorganic group such as a polyfluoroalkyl group or a polyfluoroalkylene group, is particularly preferred. As such a polyfluoroorganic group, a polyfluoroorganic group as described hereinafter, particularly a polyfluoro hydrocarbon group, is preferred.

As a result of extensive studies, it has been found that an isocyanate silane compound having at least one isocyanate group directly bonded to a silicon atom or a hydrolyzable silane compound having at least one hydrolyzable group directly bonded to a silicon atom and having the above-mentioned hydrophobic organic group, is particularly effective as the compound (I) in the present invention.

Hereinafter, "the reactive silane compound" is used to generally represent both "the hydrolyzable silane compound" and "the isocyanate silane compound" as described below. "The hydrolyzable silane compound" is a compound having at least one "hydrolyzable silane group" ("Si-X" where X is a hydrolyzable group) having at least one hydrolyzable group bonded to a silicon atom. "The isocyanate silane compound" is a compound having at least one "isocyanate silane group" (Si-NCO) having at least one isocyanate group bonded to a silicon atom. "The reactive silane group" represented by "Si-Z" will be used as the general term representing both of "the hydrolyzable silane group" and "the isocyanate silane group".

It is possible to consider that "the isocyanate silane group" is one type of "the hydrolyzable silane group" (namely, the isocyanate group bonded to a silicon atom may be regarded as one type of a hydrolyzable group). However, in the present invention, the two are regarded as being separate. Namely, in the present invention, the isocyanate group bonded to a silicon atom is regarded as being not a hydrolyzable group (even if the isocyanate group is actually a hydrolyzable group).

Preferred as a reactive silane compound is a compound having 1 or 2 reactive silane groups. As such a compound, more preferred is a compound of the following formula (A) (hereinafter sometimes referred to as compound A), a compound of the following formula (B) (hereinafter sometimes referred to as compound B), or in the case of the reactive silane compound (II), a compound of the following formula (B) wherein $e+g+h$ is 0.

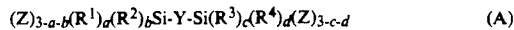

$$(Z)_{3-a-b}(R^1)_a(R^2)_b Si-Y-Si(R^3)_c(R^4)_d(Z)_{3-c-d} \qquad (A)$$

wherein each of $R^1$, $R^2$, $R^3$ and $R^4$ which are independent of one another, is hydrogen or a $C_{1-21}$ organic group, Y is a bivalent organic group, Z is a reactive Silane group (i.e. an isocyanate group or a hydrolyzable group), each of a and b which are independent of each other, is an integer of 0, 1 or 2, provided $0 \leq a+b \leq 2$, and each of c and d which are independent of each other, is an integer of 0, 1 or 2, provided $0 \leq c+d \leq 2$,

$$(R^5)_e(R^6)_g(R^7)_h Si(Z)_{4-e-g-h} \qquad (B)$$

wherein each of $R^5$, $R^6$ and $R^7$ which are independent of one another, is hydrogen or a $C_{1-21}$ organic group, provided that at least one of $R^5$, $R^6$ and $R^7$ is an organic group, Z is a reactive silane group (i.e. an isocyanate group or a hydrolyzable group), and each of e, g and h which are independent of one another, is an integer of 0, 1 or 2, provided $1 \leq e+g+h \leq 3$.

The compound (I) is preferably a reactive silane compound having at least one hydrophobic organic group. Particularly, among the compound of the above chemical formulas (A) and (B), preferred is a compound wherein at least one organic group is a hydrophobic group to obtain an excellent water drop removal property. In this case, Z in the reactive silane group may be an isocyanate group or a hydrolyzable group.

On the other hand, the reactive silane compound (II) is a compound of the above formula (A) or (B), and compound B preferably includes a compound wherein $e+g+h=0$. This reactive silane compound (II) is different from the compound (I) even when the compound (I) is a reactive silane compound. It is desirable not only that the two reactive silane compounds are different from each other, but also that the reactive silane compound (II) is not a compound capable of forming a surface having a contact angle of at least 70° against water. Accordingly, the reactive silane compound (II) preferably has no hydrophobic group, particularly no long chain hydrocarbon group or no organic group having fluorine atoms. For example, the organic group of the compound A or B is preferably an alkyl group having not more than 6 carbon atoms, particularly not more than 4 carbon atoms, or an alkylene group having not more than 8 carbon atoms, particularly not more than 6 carbon atoms.

However, these carbon numbers and hydrophobic properties are relative and may vary depending upon the types of the compounds. Accordingly, so long as the first layer has a contact angle against water higher than the second layer, the second layer formed by the treatment with the reactive silane compound (II) may have a surface having a contact angle of 70° or higher against water. Namely, in certain cases, the reactive silane compound (II) may be a compound capable of forming a surface having a contact angle of at least 70° against water.

Now, the compound (I) will be described in further detail.

When the compound (I) is an isocyanate silane compound, this compound (hereinafter sometimes referred to as the compound (I-NCO)) is required to be a compound capable of forming a surface having a contact angle of at least 70° against water. Namely, the contact angle against water of the surface treated with this compound (I-NCO) is required to be at least 70°. The surface treated with the compound (I-NCO) is the surface of the second layer to which the compound (I-NCO) has been chemically or physically bonded. Since an isocyanate group is reactive, the compound (I-NCO) is believed to be bonded to the surface of the second layer primarily by a chemical reaction. Namely, in the bonded state, the isocyanate group is believed to be in a modified form. For example, an isocyanate group is believed to react with a silanol group on the glass surface, or a silanol group formed by detachment of a hydrolyzable group or an isocyanate group is considered to react.

It is believed that due to the reactivity of the isocyanate group or due to the effect of the silicon atom directly bonded to the isocyanate group, the compound (I-NCO) exhibits excellent surface properties such as a water drop removal properly, abrasion resistance, chemical resistance and weather resistance. As will be described hereinafter, such properties can further be improved by property selecting the organic groups. Further, the number of isocyanate groups bonded to one silicon atom is preferably at least two in view of the bonding property to the second layer.

Next, when the compound (I) is a hydrolyzable silane compound, this compound (hereinafter sometimes referred to as the compound (I-X)) is required to be a compound capable of forming a surface having a contact angle of at least 70° against water. Namely, the contact angle against water of the surface treated with this compound (I-X) is required to be at least 70°. The surface treated with the compound (I-X) is the surface of the second layer to which the compound (I-X) is chemically or physically bonded. Since the hydrolyzable group is reactive, the compound (I-X) is believed to be bonded to the surface of the second layer primarily by a chemical reaction. Namely, in the bonded state, the hydrolyzable group is believed to be in a modified form.

The hydrolyzable group in this compound (I-X) is a group directly bonded to a silicon atom. Such a hydrolyzable group includes, for example, a halogen atom, an alkoxy group, an acyloxy group, an alkoxy-substituted alkoxy group, an aminoxy group, an amide group, an acid amide group and a ketoxymate group. Preferred is a hydrolyzable group bonded to a silicon atom by means of an oxygen atom, such as an alkoxy group, an alkoxy-substituted alkoxy group or an acyl group. The number of carbon atoms of such a hydrolyzable group is preferably at most 8, more preferably at most 4. Most preferred is an alkoxy group having from 1 to 4 carbon atoms.

It is believed that due to the reactivity of this hydrolyzable group or by the effect of a silicon atom to which the hydrolyzable group is directly bonded, the compound (I-X) exhibits excellent surface properties such as a water drop removal property, abrasion resistance, chemical resistance and weather resistance. As described hereinafter, these properties can further be improved by properly selecting the organic groups. The number of hydrolyzable groups bonded to one silicon atom is preferably at least two in view of the bonding property to the second layer.

The compound (I-X) may be used by itself, but may also be used as a partially hydrolyzed product obtained by hydrolysis. The partially hydrolyzed product of the compound (I-X) is a compound having e.g. a silanol group formed by partially hydrolyzing such a silane compound in water or in an acidic aqueous solution, or a compound obtained by condensation of at least two molecules by the reaction of such silanol groups. As the acid, hydrochloric acid, acetic acid, sulfuric acid, phosphoric acid or phosphonic acid may, for example, be used.

These compounds (I-NCO) and (I-X) are preferably compounds capable of forming a surface having a contact angle of at least 70° against water, among reactive silane compounds A and B of the above described chemical formulas. Such reactive silane compounds A and B (hereinafter sometimes referred to as the compounds (I-A) and (I-B), respectively), are compounds wherein $R^1$ to $R^7$ are organic groups, and at least one of these organic groups is a hydrophobic group, or Y is a hydrophobic group. All of the organic groups may of course be hydrophobic groups. The number of Z groups is preferably at least two per silicon atom. A hydrophobic group is effective for the water drop removal property, and it is believed that the larger the number of Z groups, the more firmly the bond to the second layer becomes.

When each of $R^1$ to $R^7$ is an organic group, such an organic group is preferably a hydrocarbon group such as an alkyl group, an alkenyl group, a cycloalkyl group or an aryl group, a halogenated hydrocarbon group such as a chloroalkyl group or a polyfluoroalkyl group, a (halogenated)hydrocarbon group having a hydroxyl group, an epoxy group, an amino group, a mercapto group, a carboxy group or other functional group or a (halogenated)hydrocarbon group having an ester bond, an ether bond, a thioether bond, an imino bond, an amide bond, a urethane bond or other connecting bond in its carbon chain. Among them, the hydrophobic group may be a long chain hydrocarbon group or a polyfluoroalkyl group as described hereinafter. The long chain hydrocarbon group is preferably an alkyl group or an alkenyl group having from 7 to 20 carbon atoms. As an organic group which is not a hydrophobic group, a lower alkyl group i.e. an alkyl group having from 1 to 4 carbon atoms, is preferred.

More preferred as the compounds (I-A) and (I-B) are reactive silane compounds having at least two fluorine atoms. Namely, in the case of the compound (I-A), a compound is preferred wherein Y is a bivalent organic group having at least two fluorine atoms, otherwise at least one of $R^1$ to $R^4$ is a monovalent organic group having at least two fluorine atoms. Of course, both Y and at least one of $R^1$ to $R^4$ may be organic groups having at least two fluorine atoms.

In the case of the compound (I-B), a compound is preferred in which at least one of $R^5$ to $R^7$ is a monovalent organic group having at least two fluorine atoms. In such a case, the organic group having no fluorine atom is preferably a hydrocarbon group which is not a hydrophobic group. Further, the organic group having at least two fluorine atoms is preferably bonded to the silicon atom by means of a carbon atom having no fluorine atom (such as a methylene group).

When Y is a bivalent organic group having at least two fluorine atoms, such a group is preferably a polyfluoroalkylene group, a polyfluorooxalkylene group (the one wherein at least one ether bond is present in the carbon chain of the alkylene group) or a polyfluorothioxalkylene group (the one wherein at least one thioether bond is present in the carbon chain of the alkylene group). Particularly preferred is a bivalent organic group wherein the portions bonded to both terminal silicon atoms are polymethylene chains (particularly dimethylene groups) and the intermediate portion is a perfluoroalkylene group or a perfluoroxalkylene group. The number of carbon atoms of such Y is a preferably from 6 to 30, particularly from 6 to 16.

When Y is not a bivalent organic group having at least two fluorine atoms, such a group is preferably an alkylene group, an oxalkylene group or a thioxalkylene group. Its carbon number is preferably from 2 to 30, particularly from 2 to 12.

When any one of $R^1$ to $R^7$ is a monovalent organic group having at least two fluorine atoms, such a group is preferably a polyfluoroalkyl group, a polyfluorooxalkyl group or a polyfluorothioxalkyl group, or an organic group wherein any one of such groups and a hydrocarbon group such as an alkylene group are bonded by an ester bond or other connecting bond as described above (which organic group is bonded to a silicon atom at the other terminal of the hydrocarbon group). The polyfluoroalkyl group or the polyfluorooxalkyl group is preferably the one wherein the terminal portions bonded to silicon atoms or the vicinities thereof are alkylene groups (particularly dimethylene groups) and other portion is a perfluoroalkylene group.

The perfluoro moiety of a monovalent organic group is preferably a perfluoroalkyl group, a perfluorooxalkyl group or a perfluorothioxalkyl group having at least 3 carbon atoms, particularly a perfluoroalkyl group having from 3 to 16 carbon atoms.

Specific examples for such Y or $R^1$ to $R^7$ will be presented in the following specific examples for the compounds A and B. In the following specific examples, particularly preferred as the $R_f$ group is a polyfluoroalkyl group having a perfluoroalkyl moiety of the formula $C_nF_{2n+1}C_mH_{2m}$— wherein n is an integer of from 3 to 12, and m is an integer of from 2 to 4. In the following specific examples, particularly preferred as the $R_f$ group is $C_nF_{2n+1}$— wherein n is an integer of from 3 to 16.

Specific examples of the compounds (I-A) and (I-B) will be shown below. However, the compounds (I-A) and (I-B) are not restricted to such specific examples. In the following chemical formulas, each of n and m is an integer of at least 1, R is an alkyl group, etc, $R_f$ is a polyfluoroalkyl group, and $R_F$ is a perfluoroalkyl group. In these chemical formulas, R preferably has from 1 to 12 carbon atoms, and $R_f$ is preferably an ethyl group having a perfluoroalkyl group at its terminal. Z is an isocyanate group or a hydrolyzable group.

(A-1): 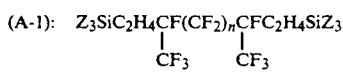

(A-2): 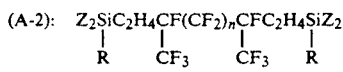

(A-3): 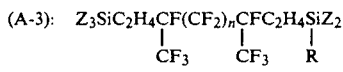

(A-4): 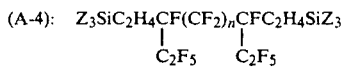

(A-5): 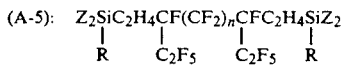

—continued (A-6): 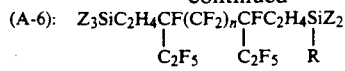

(A-7): 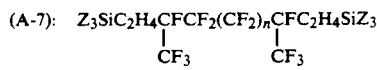

(A-8): 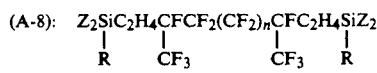

(A-9): 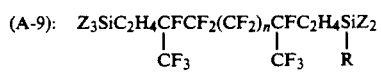

(A-10): 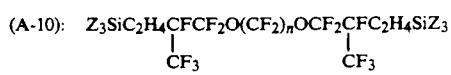

(A-11): 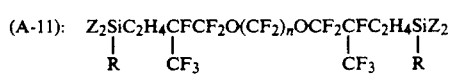

(A-12): 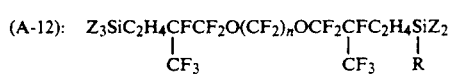

(A-13): $Z_3SiC_2H_4(CF_2)_nC_2H_4SiZ_3$ (A-14): 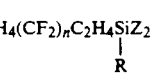

(A-15): 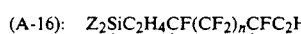

(A-16): 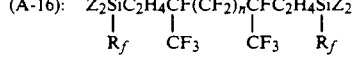

(A-17): 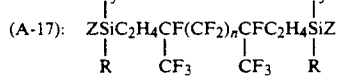

(A-18): 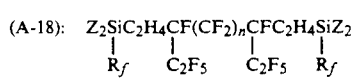

(A-19): 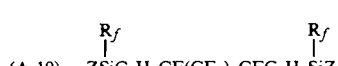

(A-20): 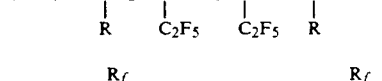

(A-21): 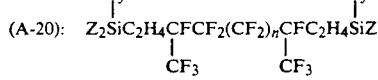

(A-22): 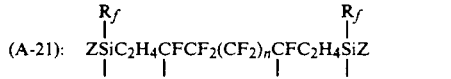

(A-23): 

(A-24): $Z_2SiC_2H_4(CF_2)_nC_2H_4SiZ_2$ (A-25): $ZSiC_2H_4(CF_2)_nC_2H_4SiZ$ with $R_f$ and $R$ substituents on each Si (A-26): $Z_2SiC_2H_4CF(CF_2)_nCFC_2H_4SiZ_3$ with $R_f$ on first Si, $CF_3$ on each CF (A-27): $Z_2SiC_2H_4CF(CF_2)_nCFC_2H_4SiZ_2$ with $R$ on each Si, $CF_3$ on each CF (A-28): $Z_3SiC_2H_4CF(CF_2)_nCFC_2H_4SiZ_2$ with $C_2F_5$ on each CF, $R_f$ on second Si (A-29): $Z_2SiC_2H_4CF(CF_2)_nCFC_2H_4SiZ$ with $R$ on each Si, $C_2F_5$ on each CF, $R_f$ on second Si (A-30): $Z_3SiC_2H_4CFCF_2(CF_2)_nCFC_2H_4SiZ_2$ with $CF_3$ groups and $R_f$ (A-31): $Z_2SiC_2H_4CFCF_2(CF_2)_nCFC_2H_4SiZ$ with $R$ on each Si, $CF_3$ groups, $R_f$ on second Si (A-32): $Z_3SiC_2H_4CFCF_2O(CF_2)_nOCF_2CFC_2H_4SiZ_2$ with $CF_3$ groups and $R_f$ (A-33): $Z_2SiC_2H_4CFCF_2O(CF_2)_nOCF_2CFC_2H_4SiZ$ with $R$ on each Si, $CF_3$ groups, $R_f$ on second Si (A-34): $Z_3SiC_2H_4(CF_2)_nC_2H_4SiZ_2$ with $R_f$ (A-35): $Z_2SiC_2H_4(CF_2)_nC_2H_4SiZ$ with $R$ and $R_f$ (A-36): $ZSiC_2H_4CF(CF_2)_nCFC_2H_4SiZ_3$ with $R$, $CF_3$, $CF_3$ (A-37): $Z_2SiC_2H_4CF(CF_2)_nCFC_2H_4SiZ_2$ with $R$, $CF_3$, $CF_3$, $R_f$ (A-38): $Z_3SiC_2H_4CF(CF_2)_nCFC_2H_4SiZ$ with $C_2F_5$, $C_2F_5$, $R$, $R_f$ (A-39): $Z_2SiC_2H_4CF(CF_2)_nCFC_2H_4SiZ_2$ with $R$, $C_2F_5$, $C_2F_5$, $R_f$ (A-40): $Z_3SiC_2H_4CFCF_2(CF_2)_nCFC_2H_4SiZ$ with $CF_3$, $CF_3$, $R$, $R_f$ (A-41): $Z_2SiC_2H_4CFCF_2(CF_2)_nCFC_2H_4SiZ_2$ with $R$, $CF_3$, $CF_3$, $R_f$ (A-42): $Z_3SiC_2H_4CFCF_2O(CF_2)_nOCF_2CFC_2H_4SiZ$ with $CF_3$, $CF_3$, $R$, $R_f$ (A-43): $Z_2SiC_2H_4CFCF_2O(CF_2)_nOCF_2CFC_2H_4SiZ_2$ with $R$, $CF_3$, $CF_3$, $R_f$ (A-44): $Z_3SiC_2H_4(CF_2)_nC_2H_4SiZ$ with $R$, $R_f$ (A-45): $Z_2SiC_2H_4(CF_2)_nC_2H_4SiZ_2$ with $R$, $R_f$ (A-46): $Z_2SiC_2H_4SiZ_2$ with $R_f$ on each Si (A-47): $Z_2SiC_2H_4SiZ_3$ with $R_f$ (A-48): $ZSiC_2H_4SiZ_3$ with $R$ and $R_f$ (A-49): $ZSiC_2H_4SiZ_2$ with $R$, $R$, $R_f$ (A-50): $Z_2SiC_2H_4SiZ_2$ with $R$, $R_f$ (A-51): $ZSiC_2H_4SiZ$ with $R_f$, $R_f$, $R$, $R$ (A-52): $ZSiC_2H_4SiZ_2$ with $R_f$, $R_f$, $R$ (A-53): $Z_2SiC_2H_4OC_2H_4SiZ_2$ with $R_f$ on each Si (A-54): $Z_2SiC_2H_4OC_2H_4SiZ_3$ with $R_f$ (A-55): $ZSiC_2H_4OC_2H_4SiZ_3$ with $R$ and $R_f$ (A-56): ZSiC₂H₄OC₂H₄SiZ₂ with R, R, R_f substituents (A-57): Z₂SiC₂H₄OC₂H₄SiZ₂ with R, R_f substituents (A-58): ZSiC₂H₄OC₂H₄SiZ with R_f, R_f, R, R substituents (A-59): ZSiC₂H₄OC₂H₄SiZ₂ with R_f, R_f, R substituents (A-60): Z₂SiC₂H₄SC₂H₄SiZ₂ with R_f, R_f substituents (A-61): Z₂SiC₂H₄SC₂H₄SiZ₃ with R_f substituent (A-62): ZSiC₂H₄SC₂H₄SiZ₃ with R, R_f substituents (A-63): ZSiC₂H₄SC₂H₄SiZ₂ with R, R, R_f substituents (A-64): Z₂SiC₂H₄SC₂H₄SiZ₂ with R, R_f substituents (A-65): ZSiC₂H₄SC₂H₄SiZ with R_f, R_f, R, R substituents (A-66): ZSiC₂H₄SC₂H₄SiZ₂ with R_f, R_f, R substituents (A-67): Z₂SiC₂H₄OC₂H₄OC₂H₄SiZ₂ with R_f, R_f substituents (A-68): Z₂SiC₂H₄OC₂H₄OC₂H₄SiZ₃ with R_f substituent (A-69): ZSiC₂H₄OC₂H₄OC₂H₄SiZ₃ with R, R_f substituents (A-70): ZSiC₂H₄OC₂H₄OC₂H₄SiZ₂ with R, R, R_f substituents (A-71): Z₂SiC₂H₄OC₂H₄OC₂H₄SiZ₂ with R, R_f substituents (A-72): ZSiC₂H₄OC₂H₄OC₂H₄SiZ with R_f, R_f, R, R substituents (A-73): ZSiC₂H₄OC₂H₄OC₂H₄SiZ₂ with R_f, R_f, R substituents (A-74): Z₂SiC₂H₄SC₂H₄SC₂H₄SiZ₂ with R_f, R_f substituents (A-75): Z₂SiC₂H₄SC₂H₄SC₂H₄SiZ₃ with R_f substituent (A-76): ZSiC₂H₄SC₂H₄SC₂H₄SiZ₃ with R, R_f substituents (A-77): ZSiC₂H₄SC₂H₄SC₂H₄SiZ₂ with R, R, R_f substituents (A-78): Z₂SiC₂H₄SC₂H₄SC₂H₄SiZ₂ with R, R_f substituents (A-79): ZSiC₂H₄SC₂H₄SC₂H₄SiZ with R_f, R_f, R, R substituents (A-80): ZSiC₂H₄SC₂H₄SC₂H₄SiZ₂ with R_f, R_f, R substituents (B-1): R_FC₂H₄SiZ₃

(B-2): R_FC₂H₄SiZ₂ with R substituent (B-3): (R_FC₂H₄)₂SiZ₂

(B-4): (R_FC₂H₄)₃SiZ (B-5): R_FCONHC₃H₆SiZ₃

(B-6): R_FCONHC₃H₆SiZ₂ with R substituent (B-7): R_FCONHC₂H₄NHC₃H₆SiZ₃

(B-8): R_FCONHC₂H₄NHC₃H₆SiZ₂ with R substituent (B-9): R_FCON(CH₃)C₂H₄CONH(CH₃)SiZ₃

(B-10): R_FCON(CH₃)C₂H₄CONH(CH₃)SiZ₂ with R substituent (B-11): R_FC₂H₄OCO(CH₂)₂S(CH₂)₃SiZ₃

-continued (B-12): $R_fC_2H_4OCO(CH_2)_2S(CH_2)_3SiZ_2$
  |
  R (B-13): $R_fC_2H_4OCONH(CH_2)_3SiZ_3$ (B-14): $R_fC_2H_4OCONH(CH_2)_3SiZ_2$
  |
  R (B-15): $R_fC_2H_4NH(CH_2)_2SiZ_3$ (B-16): $R_fC_2H_4NH(CH_2)_2SiZ_2$
  |
  R (B-17): $CF_3C_2F_4O(CFCF_2O)_m CFCONH(CH_2)_3SiZ_3$
              |             |
              $CF_3$        $CF_3$ (B-18): $CF_3C_2F_4O(CFCF_2O)_m CFCONH(CH_2)_3SiZ_2$
              |             |             |
              $CF_3$        $CF_3$        R Two or more reactive silane compounds given above may be used in combination as the compound (I). However, it is advisable to avoid a combined use of an isocyanate silane compound and a hydrolyzable silane compound, such as a combined use of a compound (I-NCO) and a compound (I-X), because the isocyanate group and the hydrolyzable group are likely to react with each other whereby the life of the treating agent tends to be shortened.

As the compound (I), it is particularly preferred to use a compound (I-NCO). The compound (I-NCO) is superior to the compound (I-X) in the film-forming property, and it is also superior in the abrasion resistance of the film, whereby the water drop removal property will be provided over a long period of time.

Further, it is preferred to use an organopolysiloxane together with the compound capable of forming a surface having a contact angle of at least 70° against water, in order to improve the effect of the surface treatment with the compound capable of forming a surface having a contact angle of at least 70° against water according to the present invention. As such an organopolysiloxane, silicone oil or a so-called modified silicone oil is suitable. Hereinafter such an organopolysiloxane will be referred to as a compound C. This compound C preferably has polymer units of the following formula (C):

$$[-SiR^8(CH_3)-O-]\quad\quad (C)$$

wherein $R^8$ is a $C_{1-16}$ organic group. This organic group $R^8$ is preferably the same organic group as described for $R^1$ to $R^7$, particularly a lower alkyl group.

The compound C is effective for improving the water drop removal property and the abrasion resistance of the coating film formed by the treatment with the compound capable of forming a surface having a contact angle of at least 70° against water, particularly with the above compound (I-A) or (I-B). The compound C may be added by itself to the composition for the surface treatment. Otherwise, it may be added after hydrolysis with an acid such as sulfuric acid, hydrochloric acid or acetic acid. Further, the viscosity of the compound C is preferably determined taking a combination with other compound into consideration. Particularly preferred is the one having a viscosity at 25° C. of from 0.5 to 1,000 centistrokes.

Now, specific examples of the compound C will be given. However, the compound C is not restricted to such specific examples. In these formulas, m, n, k and j are integers.

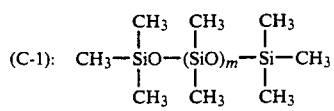

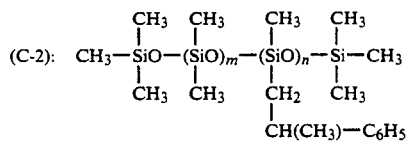

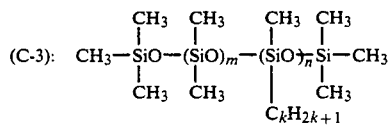

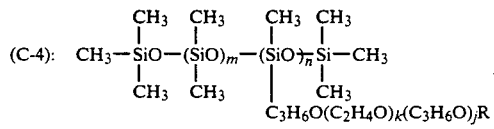

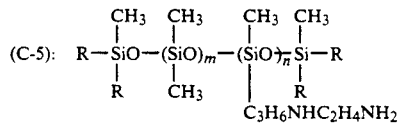

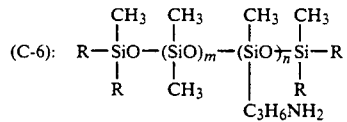

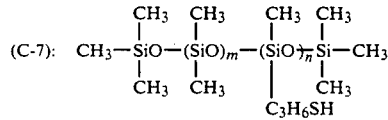

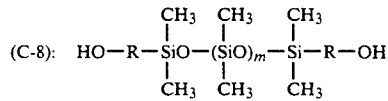

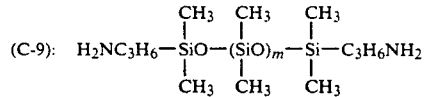

In the present invention, the composition for forming the first layer for the treatment of the surface of the second layer contains a compound having a contact angle of at least 70° against water, particularly preferably the above-mentioned compound (I-A) or (I-B), as the essential component. The blending proportion of such a compound may be optional. When the compound C is incorporated, the proportion relative to other components is optional, but the amount of incorporation is preferably from 1 to 40% by weight. If the compound C is incorporated too much, not only the abrasion resistance decreases, but also stickiness remains upon contact with the surface. On the other hand, if it is too small, the abrasion resistance or the operation efficiency tends to be inadequate in some cases.

The compound C serves to improve the water drop removal property of the coating film or to improve the durability of the film by the interaction with other components (such as the above-mentioned compound (I-A) or (I-B)). The detailed mechanism is not known. However, it is believed that the compound C interacts with other components in a complicated way and consequently controls microscopic distributions of various organic groups, particularly polar groups and ionic bonds present in the surface, whereby a surface structure most suitable for the removal of water drops will be established.

The interaction of the molecules with such other selected components is believed to contribute to a remarkable improvement of the durability. Further, each compound having a contact angle of at least 90° against water is a substance having a low free surface energy, and a compound in a free state partially present in the coating film may move on the extreme surface layer so that the frictional resistance at the surface will be reduced. This is believed to be one of the factors for excellent abrasion resistance.

To the treating agent of the present invention, other compounds or additives may be added depending upon the particular purpose. The additives, etc. may suitably be selected taking the reactivity and compatibility with other components into consideration. For example, it is possible to incorporate super fine particles of various metal oxides such as silica, alumina, zirconia or titania or various resins. Further, a dye or pigment may also be added if tinting is required. The amount of additives is usually at a level of from 0.01 to 20% by weight based on the total amount of other components, and an excessive addition is not advisable, since such will reduce the water drop removal property or abrasion resistance of the present invention.

The above composition may directly be coated on the second layer as the coating object by a manual application method. Otherwise, it may be used in the form of a solution prepared by dissolving or diluting it with an organic solvent. The total amount of various components contained in the solution by means of such an organic solvent is determined taking into consideration the formability of the coating film (operation efficiency), the stability, the thickness of the coating film and the economical aspect, and it is usually within a range of from 0.1 to 30% by weight.

As the organic solvent, various organic solvents such as acetic acid esters, aromatic hydrocarbons, halogenated hydrocarbons, ketones, ethers or alcohols, may be employed. However, when the compound A or B has an isocyanate group, a solvent having a reactive functional group (such as a hydroxyl group) is undesirable. Therefore. With respect to the compound (I-NCO), alcohols are not desirable, but with respect to the compound (I-X), there is no particular restriction. The diluting solvent may not be limited to one type, and two or more solvents may be used in combination as a mixture.

For the treatment of the surface of the second layer, no special pretreatment is required. A coating film may be formed by applying the liquid containing the composition thus prepared, on the surface by a usual method, such as brush coating, casing, rotary coating, dip coating or spray coating, followed by drying in air or in a nitrogen stream.

Excellent properties can be obtained simply by drying in air. However, for the purpose of increasing the drying rate, heating may be employed without any problem. The heating temperature is preferably at a level of from 50° to 250° C., and the heating time is usually from 5 to 60 minutes. If necessary, the heating temperature and time may be determined taking into consideration the heat resistance of the substrate.

The thickness of the first layer formed by this surface treatment is not particularly limited. However, it is preferred to be very thin. A preferred film thickness is at most 2 μm. The lower limit is a single molecular layer thickness.

Now, the reactive silane compound (II) and the second layer formed by treatment therewith, will be described.

In the present invention, as the material for forming the second layer, the reactive silane compound (II) is used. The second layer constituting an underlayer of the first layer serves to improve the durability of the first layer remarkably, and it also has an effect of improving the adhesion to the substrate. This second layer is usually formed on the substrate surface. However, there is no particular problem even when the substrate surface already has a vapor-deposited film, a sputtered film or various films formed by e.g. a wet system.

The reactive silane compound (II) which forms the second layer, is a comound in which an isocyanate group is bonded directly to a silicon atom or a compound in which a hydrolyzable group is bonded directly to a silicon atom, like the above-mentioned compound (I-NCO) or (I-X), and it firmly bonds to the first layer and to the underlayer (such as the substrate) by the reactivity of the isocyanate group and by the effect of the silicon to which isocyanate is directly bonded, or by the effect of the silicon to which the hydrolyzable group is directly bonded, and thus contributes to the improvement of the abrasion resistance. Accordingly, the larger the number of isocyanate groups or hydrolyzable groups, per silicon atom, directly bonded to silicon atoms, the better.

When the essential component for forming the first layer is a reactive silane compound, the group of the compounds selected from reactive silane compounds and the group of compounds selected from reactive silane compounds (II) for forming the second layer must not be identical. Because if the two groups are identical, such is physically meaningless. However, the two groups of compounds selected from reactive silane compounds may contain the same compound.

Preferred as the reactive silane compound (II) is a compound of the above chemical formula (A) or (B) (hereinafter sometimes referred to as the compound (II-A) or (II-B), respectively, but the compound (II-B) includes a compound wherein $e+h+g=0$). Preferably, it is a compound of the formula (A) or (B) other than the above compound (I).

When the reactive silane compound (II) is the compound (II-A) or (II-B), it may have at least one organic group bonded to a silicon atom. In such a case, the organic group is preferably an organic group which is not an organic group having a fluorine atom, more preferably a hydrocarbon group. Most preferably, it is a lower alkyl group or an alkylene group having not more than 6 carbon atoms. When the compound (I) has an organic group containing a fluorine atom, the organic group of the compound (II-A) or (II-B) may be the one having a low hydrophobic nature relative thereto, and in some cases, it may be a long chain hydrocarbon group.

Especially from the viewpoint of the adhesion to the first layer and to the underlayer (such as the substrate), the larger the number of isocyanate groups or hydrolyzable groups bonded to a silicon atom, the better. In the case of the compound (II-A), a compound of the formula (A) wherein $a+b=0$ and $c+d=0$, is preferred. In the case of the compound (II-B), a compound of the formula (B) wherein $e+g+h=0$, is preferred.

Specific examples of the compound in which an isocyanate group is bonded directly to silicon (hereinafter sometimes referred to as the isocyanate compound (II-NCO)) among the reactive silane compounds (II), will be given. However, the isocyanate silane compound (II-NCO) is not limited to such specific examples. In the following formulas, p is an integer, preferably an integer of from 2 to 8.

(D-1): $(OCN)_3Si(CH_2)_pSi(NCO)_3$ (D-2): $(OCN)_2Si(CH_2)_pSi(NCO)_2$
       with $CH_3$ substituents (D-3): $OCNSi(CH_2)_pSiNCO$
       with $CH_3$ substituents (two on each Si)

(D-4): $(OCN)_3SiC_2H_4OC_2H_4Si(NCO)_3$ (D-5): $(OCN)_3SiC_2H_4OC_2H_4OC_2H_4Si(NCO)_3$ (D-6): $(OCN)_3SiC_2H_4SC_2H_4Si(NCO)_3$ (D-7): $(OCN)_3SiC_2H_4SC_2H_4SC_2H_4Si(NCO)_3$ (D-8): $(OCN)_2SiC_2H_4OC_2H_4Si(NCO)_2$
       with $CH_3$ substituents (D-9): $(OCN)_2SiC_2H_4SC_2H_4Si(NCO)_2$
       with $CH_3$ substituents (D-10): $(OCN)_2SiC_2H_4OC_2H_4OC_2H_4Si(NCO)_2$
        with $CH_3$ substituents (D-11): $(OCN)_2SiC_2H_4SC_2H_4SC_2H_4Si(NCO)_2$
        with $CH_3$ substituents (E-1): $Si(NCO)_4$ (E-2): $CH_3Si(NCO)_3$ (E-3): $C_2H_5Si(NCO)_3$ (E-4): $C_3H_7Si(NCO)_3$ (E-5): $C_4H_9Si(NCO)_3$, (E-6): $C_6H_{13}Si(NCO)_3$ (E-7): $C_8H_{17}Si(NCO)_3$ (E-8): $C_{10}H_{21}Si(NCO)_3$ (E-9): $C_{16}H_{33}Si(NCO)_3$ (E-10): $C_6H_5Si(NCO)_3$ (E-11): $CH_2=CHSi(NCO)_3$ (E-12): $NH_2C_3H_6Si(NCO)_3$ (E-13): $HSC_3H_6Si(NCO)_3$ (E-14): $CH_2CHCH_2C_3H_6Si(NCO)_3$
        $\quad\quad\overset{O}{\smile}$ (E-15): $NH_2C_2H_4NHC_3H_6Si(NCO)_3$ (E-16): $CH_2=CCOOC_3H_6Si(NCO)_3$,
        with $CH_3$ substituent (E-17): $ClC_3H_6Si(NCO)_3$, (E-18): $CH_3Si(NCO)_2$ with $CH_3$ (E-19): $C_2H_5Si(NCO)_2$ with $CH_3$ (E-20): $C_3H_7Si(NCO)_2$ with $CH_3$ (E-21): $C_4H_9Si(NCO)_2$ with $CH_3$ (E-22): $C_6H_{13}Si(NCO)_2$ with $CH_3$ (E-23): $C_6H_{17}Si(NCO)_2$ with $CH_3$ (E-24): $C_{16}H_{21}Si(NCO)_2$ with $CH_3$ (E-25): $C_{16}H_{33}Si(NCO)_2$ with $CH_3$ (E-26): $C_6H_5Si(NCO)_2$ with $CH_3$ (E-27): $CH_2=CHSi(NCO)_2$ with $CH_3$ (E-28): $NH_2C_3H_6Si(NCO)_2$ with $CH_3$ (E-29): $HSC_3H_6Si(NCO)_2$ with $CH_3$ (E-30): $CH_2CHCH_2C_3H_6Si(NCO)_2$
        $\quad\overset{O}{\smile}\quad$ with $CH_3$ (E-31): $NH_2C_2H_4NHC_3H_6Si(NCO)_2$ with $CH_3$ (E-32): $CH_2=CCOOC_3H_6Si(NCO)_2$
        with $CH_3$ substituents (two)

(E-33): $ClC_3H_6Si(NCO)_2$ with $CH_3$ (E-34): $C_6H_5Si(NCO)_2$ with $C_6H_5$

Further, among the reactive silane compounds, the compound in which a hydrolyzable group is bonded directly to silicon (hereinafter sometimes referred to as a hydrolyzable silane compound (II-X)) is preferably the compound (II-B) (provided that Z is a hydrolyzable group, and $e+h+g=0$ is included) from the viewpoint of the adhesion to the substrate and to the first layer.

Specific examples of the hydrolyzable silane compound (II-X) will be given below. However, the hydrolyzable silane compound (II-X) is not limited to such specific examples.

Tetraalkoxysilanes such as tetramethoxysilane, tetraethoxysilane, tetra(n-propoxy)silane, tetra(i-propoxy)silane, tetra(n-butoxy)silane, tetra(secbutoxy)silane and tetra(t-butoxy)silane; trialkoxysilanes such as methyltrimethoxysilane, methyltriethoxysilane, methyltriethoxysilane, methyltrimethoxyethoxysilane, ethyltriethoxysilane, vinyltrimethoxysilane, phenyltriethoxysilane, γ-chloropropyltrimethoxysilane, γ-chloropropyltriethoxysilane, chloromethyltrimethoxysilane, chloromethyltriethoxysilane, γ-methacryloxypropyltrimethoxysilane, γ-mercaptopropyltrimethoxysilane, γ-mercaptopropyltriethoxysilane, γ-aminopropyltrimethoxysilane, γ-aminopropyltriethoxysilane, N-β-(aminoethyl)-γ-aminopropyltrimethoxysilane, β-cyanoethyltriethoxysilane, glycidoxymethyltrimethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxymethyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltripropoxysilane, β-(3,4-epoxycyclohexyl)ethyltributoxysilane, β-(3,4-epoxycycloehexyl)ethyltriethoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane and δ-(3,4-epoxycyclohexyl)butyltriethoxysilane; triacyloxysilanes such as methytriacetoxysilane, vinyltriacetoxysilane, phenyltriacetoxysilane and γ-chloropropyltriacetoxysilane; triphenoxysilanes such as methyltriphenoxysilane, γ-glycidoxypropyltriphenoxysilane and β-(3,4-epoxycyclohexyl)ethyltriphenoxysilane; dialkoxysilanes such as dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylethyldiethoxysilane, γ-glycidoxypropylethyldipropoxysilane, γ-glycidoxypropylvinyldimethoxysilane, γ-glycidoxypropylvinyldiethoxysilane and γ-glycidoxypropylphenyldiethoxysilane; diacyloxysilanes such as dimethyldiacetoxysilane; and diphenoxysilanes such as γ-glycidoxypropylmethyldiphenoxysilane.

In the present invention, as the reactive silane compound (II), it is preferred to selectively use the isocyanate silane compound (II-NCO). The isocyanate silane group has a high reactivity as compared with the hydrolyzable silane group, and the reactivity of isocyanate groups to one another is low. Thus, it is excellent in the adhesion to the substrate. Further, when the second layer is formed, the majority of isocyanate silane groups which have not reacted with the substrate are converted to silanol groups (Si—OH), and many of them are reacted with the first layer. (Whereas, in the case of hydrolyzable silane groups, the reactivity of the hydrolyzable silane groups to one another is high, whereby when the second layer is formed, there will be a less amount of silanol groups present on the surface as compared with the case where the isocyanate silane compound (II-NCO) is used.) Accordingly, the adhesion between the first layer and the second layer will be high, thus leading to excellent properties such as abrasion resistance and durability. The most preferred reactive silane compound (II) is tetraisocyanate silane.

As the treating agent to form the second layer of the present invention, it is advisable to use a solution or dispersion containing the reactive silane compound (II) as an essential component. To this composition, other additives may be incorporated in addition to a solvent and a dispersing agent. As the solvent, those described above with respect to the compound (I) may be employed. However, with respect to the compound (II-NCO), alcohols are not suitable. The additives may, for example, be the above-mentioned filler such as super fine particles of an metal oxide, a binder component and a surfactant. Their proportions may preferably be as mentioned above. Their amounts may also preferably be as mentioned above.

For the surface treatment of the substrate, no special pretreatment is required. However, pretreatment may be conducted as the case requires. For example, acid treatment with e.g. diluted hydrofluoric acid or hydrochloric acid, alkali treatment with e.g. an aqueous sodium hydroxide solution, or discharge treatment by e.g. plasma irradiation, may be conducted.

The second layer may be formed by applying a liquid composed of an organic solvent containing the composition thus prepared, by a usual treating method, such as brush coating, casting, rotary coating, dip coating or spray coating, followed by drying in air or in a nitrogen stream at room temperature or under heating. Adequate drying can usually be conducted at room temperature. However, when the drying is conducted under heating, the temperature and time may be determined in consideration of the heat resistance of the substrate. However, heat drying at a temperature for an extended period of time is likely to adversely affect the adhesion to the first layer.

There is no particular restriction as to the thickness of the second layer formed by this surface treatment. It may be very thin. A preferred film thickness is at most 2 μm like the case of the first layer. Further, the lower limit is a single molecular layer thickness. A too much thickness is undesirable from the economical viewpoint and from the viewpoint of the quality of appearance.

The thickness of each layer to be formed may suitably be controlled by adjusting the concentration of the composition of the liquid containing the prepared composition, the coating conditions, the heating conditions, etc. The first layer of the present invention has a relatively low refractive index, whereby low reflecting properties may be imparted. If such an effect is desired, the thickness of the first layer may be adjusted to a thickness where an optical interference will occur. Theoretically, the thickness of the coating film may be at least the thickness of a single molecular layer to obtain a water drop removal property. Taking an economical effect into consideration, the thickness is preferably at most 2 $\mu$m, as mentioned above.

In the present invention, when the compound (I) is an isocyanate compound having at least one polyfluoroorganic group, excellent water repellency, water drop removal property and suitable adhesion, can be achieved, even without providing a layer treated with the compound (II). However, in order to accomplish better adhesion, it is preferred to provide an underlayer treated with the compound (II).

There is no particular restriction as to the substrate to which the present invention may be applied. For example, a metal, a plastic, glass, ceramic or other inorganic materials, an organic material, or a combination thereof (composite material, laminated material, etc.) may be mentioned. Further, the surface of the substrate may, of course, be the substrate surface itself, or may be the surface of a material different from the substrate surface, such as the coating surface of e.g. a coated metal plate, or the surface of a surface-treated layer of e.g. surface-treated glass. With respect to the shape of the substrate, it may not necessarily be a flat plate, and it may have an optional shape depending upon the particular purpose, such as the one having a curvature over the entire surface or at a part thereof.

In the present invention, a particularly suitable substrate is a substrate made of a transparent material such as glass or plastic, and a suitable article having such a substrate mounted to utilize the transparency. Thus, the substrate of the present invention is particularly suitable for articles for transportation equipments and articles for buildings or building decorations.

Articles for transportation equipments may be exterior parts such as outer plates, window glasses, mirrors and display panels, and interior parts such as instrument panels, of the transportation equipments such as electric cards, buses, trucks, automobiles, ships or aircrafts, or parts or constituting elements to be used or already used in other transportation equipments. Such an article may be composed solely of the surface-treated substrate or may have the surface-treated substrate incorporated therein. For example, the former may be a window glass for an automobile, and the latter may be a back mirror for an automobile in which a glass mirror is incorporated.

The articles for transportation equipments include bodies, window glasses, pantagraphs, etc. of electric cars, bodies, front glasses, side glasses, rear glasses, mirrors, bampers, etc. of automobiles, buses or trucks, bodies, window glasses, etc. of ships, and bodies, window glasses, etc. of aircrafts.

With such substrates or articles, water drops on the surface will be repelled by the water drops removal property. Especially, in operation, due to the interaction with the receiving wind pressure, water drops rapidly move on the surface and will not remain as water drops, whereby any adverse effect which may otherwise be induced by moisture, can be eliminated. Especially in the application to a see-through portion such as a window glass, it becomes easy to secure a viewing field due to dissipation of water drops, thus leading to improvement of the safety of a vehicle. Further, in an environment where water drops usually freeze, no freezing takes place, or even if freezing takes place, the frozen drops can readily be defrosted. Further, there will be no substantial deposition of water drops, whereby the number of periodical cleaning operations can be reduced. Besides, the cleaning operation is very easy, such being advantageous also from the protection of good appearance.

Further, the articles for buildings or building decorations may be articles to be attached to buildings or articles already attached to buildings, or articles for buildings which are not attached to buildings but which are used for the buildings, articles for buildings such as furnitures or equipments, and base materials (such as glass plates) constituting such articles.

Specifically, they include window glass plates, window glasses, glass plates for roofs, various roofs including glass roofs, glass plates for doors or doors having such glass plates installed, glass plates for partitions, glass plates for green houses, or green houses having such glass plates, transparent plastic plates to be used instead of glass, the above-mentioned various articles for buildings (window materials and roof materials) having such plastic plates incorporated, wall materials made of ceramics, cement, metals or other materials, mirrors, furnitures and display shelves having such walls or mirrors, and glass for showcases.

Such an article may be made of the surface treated substrate alone or may be the one having the surface treated substrate incorporated therein. For example, the former may be a window glass plate, and the latter may be a furniture in which a glass mirror is incorporated.

With such a surface treated substrate, water drops which are brought in contact with the surface are repelled due to the water drop removal property and scarcely attach to the surface, or if attached, the amount is small and the attached water drops can easily be removed. Further, even in an environment where water drops usually freeze, no freezing takes place, or even if freezing takes place, the frozen drops can readily be defrosted. Further, there will be no substantial deposition of water drops, whereby the number of periodical cleaning operations can be reduced, and each cleaning operation will be very easy, and such being advantageous also from the viewpoint of the protection of good appearance.

Now, the present invention will be described in further detail with reference to Examples. However, it should be understood that the present invention is by no means restricted to such specific Examples.

The methods for evaluating various properties and the compounds used in the Examples are as follows.

1. Water repellency

The contact angle of a water drop having a size of 1 mm in diameter was measured. Measurements were made at five different points on the surface, and the contact angle was represented by the average value.

2. Water drop removal property

A test sample was held vertically, and from a nozzle held at a distance of 20 cm from the sample surface, water was sprayed over the entire surface for about one hour, whereupon water drops remaining on the surface were visually observed, and evaluated by the following evaluation standards:

A: no water remained on the sample surface
B: water slightly remained on the sample surface
C: water substantially remained on the sample surface
D: water spread on the sample surface

3. Dropping angle

The dropping angle of a water drop having a size of 2 mm in diameter was measured. Measurements were conducted at five different points on the surface, and the dropping angle was represented by the average value.

4. Abrasion resistance

Tester: Taber rotary abrader (manufactured by Kabushiki Kaisha Toyo Seiki Seisakusho)

Test condition: Abrading ring H-22, load: 1 kg, number of rotations: 300 times or 500 times.

The abrasion resistance test was conducted by the above test method, and the water drop removal property after the test was evaluated. The number of rotations being 300 times is designated as abrasion resistance 3, and the number of rotations being 500 times is designated as abrasion resistance 5.

5. Weather resistance

A process comprising ultraviolet irradiation for 8 hours (70° C.) and humidity exposure for 4 hours (50° C.) is regarded as one cycle, and the weather resistance test was conducted by 200 cycles.

The weather resistance test was conducted by the above method, and the water removal property after the test was evaluated.

6. Boiling

A test sample was immersed in boiling water for one hour. The water drop removal property after the test was evaluated.

7. Compounds used (a) $C_9F_{19}C_2H_4Si(OCH_3)_3$
(b) $(CH_3O)_3SiC_2H_4C_6F_{12}C_2H_4Si(OCH_3)_3$
(c) $C_9F_{19}C_2H_4Si(NCO)_3$
(d) $(OCN)_3SiC_2H_4Si(NCO)_3$
(e) $Si(NCO)_4$
(f) $Si(OCH_3)_4$
(g) $CH_3Si(OCH_3)_3$
(h) $CH_3Si(NCO)_3$
(i) $C_8H_{17}Si(NCO)_3$
(j) $(CH_3)_2Si(NCO)_2$
(k) $C_8F_{17}CH_2CH_2Si(NCO)_3$
(l) $(OCN)_3SiC_2H_4C_6F_{12}C_2H_4Si(NCO)_3$
(m) $(CH_3)_3SiO-[Si(CH_3)_2-O-]_n-Si(CH_3)_3$ (viscosity of 50 centistokes)
(n) $(CH_3O)_2(CH_3)SiC_2H_4C_6F_{12}C_2H_4Si(CH_3)(OCH_3)_2$
(o) $C_8F_{17}CH_2CH_2Si(OCH_3)_3$
(p) Epoxy resin ("EP 827", tradename, manufactured by Yuka Shell Epoxy K.K.)
(q) Silica sol dispersed in methanol (solid content: 30 wt %, manufactured by Shokubai Kasei K.K.)
(r) Dimethylpolysiloxane having a viscosity of 50 centistokes (KF96, manufactured by Shinetsu Chemical Industries Company Limited)
(s) Modified diemthylpolysiloxane having a viscosity of 42 centistokes and having hydroxyl groups at both terminals (KF6001, manufactured by Shinetsu Chemical Industries Company Limited)
(t) Modified dimethylpolysiloxane having a viscosity of 50 centistokes and having carboxyl groups (X-22-3710, manufactured by Shinetsu Chemical Industries Company Limited)

Preparation of treating agent 1

Into a three necked flask equipped with a stirrer and a thermometer, 51.0 g of compound (a), 190.5 g of compound (b), 56.3 g of compound (f), 6,020.0 g of 2-propanol and 14,500.0 g of 2-methyl-2-propanol were added and stirred for one hour. Then, 22.2 g of magnesium perchlorate was added thereto, and the mixture was thoroughly stirred. While maintaining the temperature of this solution at a level of not higher than 5° C., 67.4 g of a 1% hydrochloric acid aqueous solution was gradually dropwise added. After completion of the dropwise addition, stirring was continued for five days while maintaining the liquid temperature at a level of 25° C. to obtain treating agent 1.

Preparation of treating agent 2

Into a three necked flask equipped with a stirrer and a thermometer, 45.0 g of compound (a), 180.5 g of compound (b), 46.3 g of compound (f), 36.1 g of compound (q), 6.3 g of compound (t), 6,050.0 g of 2-propanol and 15,000.0 g of 2-methyl-2-propanol were added and stirred for one hour. Then, 25.2 g of magnesium perchlorate was added thereto, and the mixture was thoroughly stirred. While maintaining the temperature of this solution at a level of not higher than 5° C., 70.4 g of a 1% hydrochloric acid aqueous solution was gradually dropwise added thereto. After completion of the dropwise addition, stirring was continued for five days while maintaining the liquid temperature at 25° C. to obtain treating agent 2.

Preparation of treating agent 3

Into a three necked flask equipped with a stirrer and a thermometer, 50.0 g of compound (a), 182.5 g of compound (b), 50.3 g of compound (f), 25.1 g of compound (g), 40.3 g of compound (q), 5,980.0 g of 2-propanol and 15,500.0 g of 2-methyl-2-propanol were added and stirred for one hour. Then, 23.4 g of magnesium perchlorate was added thereto, and the mixture was thoroughly stirred. While maintaining the temperature of this solution at a level of not higher than 5° C., 74.2 g of a 1% hydrochloric acid aqueous solution was gradually dropwise added thereto. After completion of the dropwise addition, stirring was continued for five days while maintaining the liquid temperature at 25° C. to obtain treating agent 3.

Preparation of treating agent 4

Into a three necked flask equipped with a stirrer and a thermometer, 75.5 g of compound (c) and 2,425.0 g of ethyl acetate were added. While maintaining the liquid temperature of this solution at 25° C., stirring was continued for one day to obtain treating agent 4.

Preparation of treating agent 5

Into a three necked flask equipped with a stirrer and a thermometer, 50.0 g of compound (h), 15.0 g of compound (j), 10.2 g of compound (e), 1,911.0 g of ethyl acetate and 535.4 g of toluene were added. While maintaining the liquid temperature of this solution at 25° C., stirring was continued for one day to obtain treating agent 5.

Preparation of treating agent 6

Into a three necked flask equipped with a stirrer and a thermometer, 65.4 g of compound (i), 5.0 g of compound (d), 3.2 g of compound (r), 1,900.0 g of isobutyl acetate and 500.0 g of methyl ethyl ketone were added. While maintaining the liquid temperature of this solution at 25° C., stirring was continued for one day to obtain treating agent 6.

Preparation of treating agent 7

Into a three necked flask equipped with a stirrer and a thermometer, 35.1 g of compound (c), 35.4 g of compound (i), 3.5 g of compound (s) and 2,410.0 g of isobutyl acetate were added. While maintaining the liquid temperature of this solution at 25° C., stirring was continued for one day to obtain treating agent 7.

Preparation of treating agent 8

Into a three necked flask equipped with a stirrer and a thermometer, 55.5 g of compound (e) and 2,775.6 g of isobutyl acetate were added. While maintaining the liquid temperature of this solution at 25° C., stirring was continued for one day to obtain treating agent 8.

Preparation of treating agent 9

Into a three necked flask equipped with a stirrer and a thermometer, 35.7 g of compound (e), 24.3 g of compound (d) and 2,775.6 g of ethyl acetate were added. While maintaining the liquid temperature of this solution at 25° C., stirring was continued for one day to obtain treating agent 9.

Preparation of treating agent 10

Into a flask equipped with a stirrer and a thermometer, 78.5 g of compound (f), 1,020.2 g of methyl alcohol and 2,000.0 g of isopropyl alcohol were added and stirred for one hour. While maintaining the temperature of this solution at 5° C., 37.2 g of a 1% hydrochloric acid aqueous solution was gradually dropwise added thereto. After completion of the dropwise addition, stirring was continued for five days while maintaining the liquid temperature at 25° C. to obtain treating agent 10.

Preparation of treating agent 11

Into a flask equipped with a stirrer and a thermometer, 75.0 g of compound (f), 10.9 g of compound (q), 1,203.5 g of methyl alcohol and 2,000.0 g of isopropyl alcohol were added and stirred for one hour. While maintaining the temperature of this solution at 5° C., 35.5 g of a 1% hydrochloric acid aqueous solution was gradually dropwise added thereto. After completion of the dropwise addition, stirring was continued for five days while maintaining the liquid temperature at 25° C. to obtain treating agent 11.

Preparation of treating agent 12

Into a flask equipped with a stirrer and a thermometer, 56.3 g of compound (b), 29.4 g of compound (o) and 43.9 g of compound (f) were added and mixed, then 1,531.9 g of methyl alcohol and 7,000.0 g of isopropyl alcohol were added, and 8.9 g of sodium acetate was further added, and the mixture was stirred for one hour. While maintaining the temperature of this solution at 5° C., 34.5 g of a 1% hydrochloric acid aqueous solution was gradually dropwise added thereto. After completion of the dropwise addition, stirring was continued for five days while maintaining the liquid temperature at 25° C. to obtain treating agent 12.

Preparation of treating agent 13

Into a flask equipped with a stirrer and a thermometer, 23.0 g of compound (b), 10.8 g of compound (n), 30.0 g of compound (o), 22.4 g of compound (f) and 13.6 g of compound (p) were added and mixed, then 1,708.9 g of methyl alcohol and 7,000.0 g of isopropyl alcohol were added, and the mixture was stirred for one hour. While maintaining the temperature of this solution at 5° C., 23.6 g of a 1% hydrochloric acid aqueous solution was gradually dropwise added thereto. After completion of the dropwise addition, stirring was continued for five days while maintaining the liquid temperature at 25° C. to obtain treating agent 13.

Preparation of treating agent 14

Into a flask equipped with a stirrer and a thermometer, 20.2 g of compound (i) and 1,980.0 g of butyl acetate were added. While maintaining the temperature of this solution at 25° C., stirring was continued for one day to obtain treating agent 14.

Preparation of treating agent 15

Into a flask equipped with a stirrer and a thermometer, 19.9 g of compound (k) and 10.3 g of compound (l) were added and mixed, and 985.3 g of ethyl acetate, 54.2 g of isopropyl alcohol and 456.3 g of trichlorotrifluoroethane (R-113) were further added. While maintaining the liquid temperature of this solution at 25° C., stirring was continued for five days to obtain treating agent 15.

Preparation of treating agent 16

Into a flask equipped with a stirrer and a thermometer, 9.8 g of compound (i), 2.4 g of compound (e) and 9.8 g of compound (k) were added and mixed, and 970.0 g of butyl acetate, 35.5 g of isopropyl alcohol and 200.0 g of trichlorotrifluoroethane (R-113) were added thereto. While maintaining the liquid temperature of this solution at 25° C., stirring was continued for one day to obtain treating agent 16.

Preparation of treating agent 17

Into a flask equipped with a stirrer and a thermometer, 19.9 g of compound (k) and 10.3 g of compound (l) were added and mixed, and 985.3 g of ethyl acetate, 54.2 g of isopropyl alcohol and 456.3 g of trichlorotrifluoroethane (R-113) were added. 1.8 g of compound (m) and 0.2 g of sulfuric acid were added. While maintaining the liquid temperature of this solution at 25° C., stirring was continued for five days to obtain treating agent 17.

EXAMPLE 1

A glass plate of 10 cm×10 cm (thickness: 3 mm) was dipped in a solution of treating agent 8 and withdrawn therefrom at a rate of 5 cm/min, followed by drying at room temperature. This test piece was dipped in a solution of treating agent 1 and withdrawn therefrom at a rate of 5 cm/min, followed by heating at 200° C. for 30 minutes to obtain a sample test piece. This test piece was evaluated, and the results are shown in Table 1.

EXAMPLE 2

The test and evaluation were conducted in the same manner as in Example 1 except that treating agent 8 in Example 1 was changed to treating agent 9. The results are shown in Table 1.

EXAMPLE 3

The test and evaluation were conducted in the same manner as in Example 1 except that treating agent 1 in Example 1 was changed to treating agent 2. The results are shown in Table 1.

EXAMPLE 4

The test and evaluation were conducted in the same manner as in Example 1 except that treating agent 1 in Example 1 was changed to treating agent 3. The results are shown in Table 1.

EXAMPLE 5

A glass plate of 10 cm × 10 cm (thickness: 3 mm) was dipped in a solution of treating agent 8 and withdrawn therefrom at a rate of 5 cm/min, followed by drying at room temperature. This test piece was dipped in a solution of treating agent 4 and withdrawn therefrom at a rate of 5 cm/min, followed by drying at room temperature to obtain a sample test piece. This test piece was evaluated, and the results are shown in Table 1.

EXAMPLE 6

The test and evaluation were conducted in the same manner as in Example 5 except that treating agent 4 in Example 5 was changed to treating agent 5. The results are shown in Table 1.

EXAMPLE 7

The test and evaluation were conducted in the same manner as in Example 5 except that treating agent 4 in Example 5 was changed to treating agent 6. The results are shown in Table 1.

EXAMPLE 8

The test and evaluation were conducted in the same manner as in Example 5 except that treating agent 4 in Example 5 was changed to treating agent 7. The results are shown in Table 1.

EXAMPLE 9

A glass plate of 10 cm × 10 cm (thickness: 3 mm) was dipped in a solution of treating agent 1 and withdrawn therefrom at a rate of 5 cm/min, followed by heating at 200° C. for 30 minutes to obtain a sample test piece. This test piece was evaluated, and the results are shown in Table 1.

COMPARATIVE EXAMPLE 1

A glass plate of 10 cm × 10 cm (thickness: 3 mm) was dipped in a solution of treating agent 5 and withdrawn therefrom at a rate of 5 cm/min, followed by drying at room temperature to obtain a sample test piece. This test piece was evaluated, and the results are shown in Table 1.

COMPARATIVE EXAMPLE 2

A glass plate of 10 cm × 10 cm (thickness: 3 mm) was dipped in a solution of treating agent 8 and withdrawn therefrom at a rate of 5 cm/min, followed by drying at room temperature to obtain a sample test piece. This test piece was evaluated, and the results are shown in Table 1.

TABLE 1

| | Water repellency Initial stage | Waterdrop removal property | | | |
|---|---|---|---|---|---|
| | | Initial stage | Abrasion resistance 5 | Weather resistance | Boiling |
| Example 1 | 108 | A | A | A | A |
| Example 2 | 108 | A | A | A | A |
| Example 3 | 106 | A | A | A | B |
| Example 4 | 105 | A | A | A | B |
| Example 5 | 115 | A | A | A | A |
| Example 6 | 112 | A | B | A | B |
| Example 7 | 116 | A | A | A | A |
| Example 8 | 115 | A | A | A | A |
| Example 9 | 108 | A | B | A | B |
| Comparative Example 1 | 115 | A | B | A | B |
| Comparative Example 2 | 43 | D | D | D | D |

EXAMPLE 10

The test piece prepared in Example 5 was dipped in the reagent as identified in Table 2 for 24 hours, and it was then withdrawn and immediately cleaned. Then, the change of the outer appearance and the water drop removal property of this test piece were confirmed. The results are shown in Table 2.

TABLE 2

| Reagent | Change of the outer appearance | Waterdrop removal property |
|---|---|---|
| Methanol | No change | A |
| Acetone | No change | A |
| Toluene | No change | A |
| Water | No change | A |
| 1% sulfuric acid aqueous solution | No change | A |
| 1% sodium hydroxide aqueous solution | No change | A |
| Commericially available cleaning agent | No change | A |
| Carbon tetrachloride | No change | A |
| Gasoline | No change | A |

EXAMPLE 11

The test piece prepared in Example 1 was dipped in the reagent as identified in Table 3 for 24 hours, and it was withdrawn and immediately cleaned. Then, the change of the outer appearance and the water drop removal property of this test piece were confirmed. The results are shown in Table 3.

TABLE 3

| Reagent | Change of the outer appearance | Waterdrop removal property |
|---|---|---|
| Methanol | No change | A |
| Acetone | No change | A |
| Toluene | No change | A |
| Water | No change | A |
| 1% sulfuric acid | No change | A |

TABLE 3-continued

| Reagent | Change of the outer appearance | Waterdrop removal property |
|---|---|---|
| aqueous solution 1% sodium hydroxide aqueous solution | No change | A |
| Commericially available cleaning agent | No change | A |
| Carbon tetrachloride | No change | A |
| Gasoline | No change | A |

EXAMPLE 12

Coating on the surface of a laminated front glass for an automobile was conducted in the same manner as in Example 5 to form a coating film. The laminated front glass thus obtained was mounted on an automobile. This automobile was subjected to a running test for 4 hours every day for one month, and the deposition of dust and stain on the surface of the front glass, or in a rainy day, the deposition of water drops, was visually observed every day.

As a result, no deposition of dust or stain, or no formation of fur due to deposition of water drops, was observed, or even when observed, it was readily removed by gently wiping it off with a tissue paper. Further, at the time of raining, water drops on the surface were repelled and moved away swiftly by the interaction with the wind pressure due to running, whereby the viewing field was secured without using a wiper. Further, in a running test in an environment (0° C. to −5° C.) where water drops deposited on a non-treated laminated front glass would freeze, or moisture in air would condense to form frost on a front glass, no formation of frost on the front glass was observed.

In a severer low temperature environment (−10° C. to −15° C.), formation of frost on the front glass was observed, but defrosting was quick, and there was a substantial difference as compared with the non-treated front glass.

EXAMPLE 13

The running test was conducted in the same manner as in Example 12 except that the laminated front glass in Example 12 was changed to a side glass or a rear glass, whereby the same effects as in Example 12 were confirmed.

EXAMPLE 14

The running test was conducted in the same manner as in Example 12 except that the laminated front glass in Example 12 was changed to a side mirror, whereby the same effects as in Example 12 was confirmed.

EXAMPLE 15

The laminated front glass of an automobile which was used under a normal condition for 5 years, was polished with calcium carbonate, washed with water and dried for one hour. To the laminated front glass thus cleaned, treating agent 9 was applied with a cotton cloth. After drying for 10 minutes, treating 4 was then applied with a cotton cloth, followed by drying for 10 minutes. Using this automobile, a running test was conducted in the same manner as in Example 12, whereby the same effects as in Example 12 were confirmed.

EXAMPLE 16

Coating on the surface of a window glass for building was conducted in the same manner as in Example 5 to form a coating film. The window glass thus obtained was mounted on a house. The deposition of dust and stain on the surface of this window glass, or in a rainy day, the deposition of water drops, was visually observed every day.

As a result, no deposition of dust or stain, or no formation of fur due to deposition of water drops, was observed, or even when observed, it was readily be removed by gently wiping it off with a tissue paper. Further, at the time of rain, water drops on the surface were repelled and fell off, and especially when strong wind blew, water drops were readily moved off by the interaction with the wind pressure, whereby the viewing field was secured. Further, in a test under an environment (0° C. to −5° C.) where water drops deposited on a non-treated window glass would freeze, or moisture in air would condense to form frost on a window glass, no formation of frost on the window glass was observed.

In a severer low temperature environment (−10° C. to −15° C.), formation of frost on the window glass was observed, but the defrosting was quick, and there was a substantial difference as compared with the non-treated window glass.

EXAMPLE 17

A glass plate of 10 cm × 10 cm (thickness: 3 mm) was dipped in a solution of treating agent 10 and withdrawn therefrom at a rate of 11 cm/min, followed by heating at 80° C. for 10 minutes. This test piece was left to stand at room temperature for 30 minutes, and then it was dipped in a solution of treating agent 12 and then withdrawn therefrom at a rate of 11 cm/min, followed by heating at 200° C. for 30 minutes to obtain a sample test piece. This test piece was evaluated, and the results are shown in Table 4.

EXAMPLE 18

The test and evaluation were conducted in the same manner as in Example 17 except that treating agent 12 in Example 17 was changed to treating agent 13. The results are shown in Table 4.

EXAMPLE 19

The test and evaluation were conducted in the same manner as in Example 17 except that treating agent 10 in Example 17 was changed to treating agent 17. The results are shown in Table 4.

EXAMPLE 20

The test and evaluation were conducted in the same manner as in Example 17 except that in Example 17, treating agent 10 was changed to treating agent 11, and treating agent 12 was changed to treating agent 13. The results are shown in Table 4.

EXAMPLE 21

The test and evaluation were conducted in the same manner as in Example 17 except that in Example 17, the heating after dipping in treating agent 10 was changed from 80° C. for 10 minutes to 300° C. for 30 minutes. The results are shown in Table 4.

COMPARATIVE EXAMPLE 3

A glass plate of 10 cm × 10 cm (thickness: 3 mm) was dipped in a solution of treating agent 12 and then withdrawn therefrom at a rate of 11 cm/min to obtain a sample test piece. This test piece was evaluated, and the results are shown in Table 4.

TABLE 4

| | Water repellency Initial stage | Waterdrop removal property | | | |
|---|---|---|---|---|---|
| | | Initial stage | Abrasion resistance 3 | Weather resistance | Boiling |
| Example 17 | 108 | A | A | A | A |
| Example 18 | 108 | A | A | A | A |
| Example 19 | 108 | A | A | A | A |
| Example 20 | 108 | A | A | A | A |
| Example 21 | 108 | A | B | B | B |
| Comparative Example 3 | 108 | A | B | A | A |

EXAMPLE 22

The test piece prepared in Example 17 was dipped in the reagent as identified in Table 5 for 24 hours, and then it was withdrawn and immediately cleaned. Then, the change of the outer appearance and the water drop removal property of this test piece were confirmed. The results are shown in Table 5.

TABLE 5

| Reagent | Change of the outer appearance | Waterdrop removal property |
|---|---|---|
| Methanol | No change | A |
| Acetone | No change | A |
| Toluene | No change | A |
| Water | No change | A |
| 1% sulfuric acid aqueous solution | No change | A |
| 1% sodium hydroxide aqueous solution | No change | A |
| Commericially available cleaning agent | No change | A |
| Carbon tetrachloride | No change | A |
| Gasoline | No change | A |

EXAMPLE 23

Two surface-treatment layers were formed on the surface of the laminated front glass for automobile in the same manner as in Example 17. The laminated front glass thus obtained was mounted on an automobile. This automobile was subjected to a running test for 4 hours every day for one month. The deposition of dust and stain on the surface of the front glass, or in a rainy day, the deposition of water drops, was visually observed every day.

As a result, no deposition of dust or stain, or no formation of fur due to deposition of water drops, was observed. Even when observed, it was readily removed by gently wiping it off with a tissue paper. Further, at the time of rain, water drops on the surface were repelled and readily moved away by an interaction with the wind pressure due to running, whereby the viewing field was secured without using a wiper. Further, in a running test in an environment (0° C. to −5° C.) where water drops deposited on a non-treated laminated front glass would freeze, or moisture in air would condense to form frost on a front glass, no formation of frost on the front glass was observed.

In a severer low temperature environment (−10° C. to −15° C.), formation of frost on the front glass was observed, but defrosting was quick, and there was a substantial difference as compared with the non-treated front glass.

EXAMPLE 24

A running test was conducted in the same manner as in Example 23 except that the laminated front glass in Example 23 was changed to a side glass or a rear glass, whereby the same effects as in Example 23 were confirmed.

EXAMPLE 25

A running test was conducted in the same manner as in Example 23 except that the laminated front glass in Example 23 was changed to a side mirror, whereby the same effects as in Example 23 were confirmed.

EXAMPLE 26

Coating on the surface of a glass plate for building was conducted in the same manner as in Example 17 to form a coating film. The glass plate for building thus obtained, was mounted on a building. This window glass was subjected to an exposure test for one month, and the deposition of dust or stain on the surface of the window glass, or in a rainy day, the deposition of water drops, was visually observed every day. As a result, no deposition of dust or stain, or no formation of fur due to deposition of water drops, was observed, or even if observed, it was readily removed by gently wiping it off with a tissue paper.

Thus, the cleaning operation of the window glass was substantially simplified. Further, at the time of rain, water drops on the surface were repelled, and no spread of water was observed, whereby the viewing field was easily secured. Further, in a rainy day with a strong wind, water drops were readily moved away by the interaction with the wind pressure, whereby the viewing field was more readily secured.

Further, in an exposure test in an environment (0° C. to −5° C.) where water drops deposited on a non-treated window glass would freeze, or moisture in air would condense to form a frost on a window glass, no formation of frost on the surface of the window glass was observed. In a severer low temperature environment (−10° C. to −15° C.), formation of frost on the window glass was observed, but defrosting due to a temperature rise was quick, and there was a substantial difference as compared with the non-treated window glass.

EXAMPLE 27

An exposure test was conducted in the same manner as in Example 26 except that the glass plate for building was changed to a heat-ray reflection glass plate for building ("Sun Lux SS8" manufactured by Asahi Glass Company Ltd). As a result, the same effects as in Example 26 were confirmed.

EXAMPLE 28

A glass plate of 10 cm × 10 cm (thickness: 3 mm) was dipped in a solution of treating agent 10 and withdrawn therefrom at a rate of 11 cm/min, followed by heating at 80° C. for 10 minutes. The test piece thereby obtained was left to stand at room temperature for 30 minutes.

Then, it was dipped in a solution of treating agent 14 and withdrawn therefrom at a rate of 11 cm/min, followed by heating at 150° C. for 30 minutes to obtain a sample test piece. This test piece was evaluated, and the results are shown in Table 6.

EXAMPLE 29

The test and evaluation were conducted in the same manner as in Example 28 except that treating agent 14 in Example 28 was changed to treating agent 15. The results are shown in Table 6.

EXAMPLE 30

The test and evaluation were conducted in the same manner as in Example 28 except that treating agent 14 in Example 28 was changed to treating agent 16. The results are shown in Table 6.

EXAMPLE 31

The test and evaluation were conducted in the same manner as in Example 28 except that treating agent 14 in Example 28 was changed to treating agent 17. The results are shown in Table 6.

EXAMPLE 32

The test and evaluation were conducted in the same manner as in Example 28 except that treating agent 10 in Example 28 was changed to treating agent 11. The results are shown in Table 6.

EXAMPLE 33

The test and evaluation were conducted in the same manner as in Example 28 except that in Example 28, treating agent 10 was changed to treating agent 11, and treating agent 14 was changed to treating agent 15. The results are shown in Table 6.

EXAMPLE 34

The test and evaluation were conducted in the same manner as in Example 28 except that in Example 28, treating agent 10 was changed to treating agent 11, and treating agent 14 was changed to treating agent 16. The results are shown in Table 6.

EXAMPLE 35

The test and evaluation were conducted in the same manner as in Example 28 except that in Example 28, treating agent 10 was changed to treating agent 11, and treating agent 14 was changed to treating agent 17. The results are shown in Table 6.

EXAMPLE 36

The test and evaluation were conducted in the same manner as in Example 28 except that in Example 28, the heating after the dipping in treating agent 10 was changed from 80° C. for 10 minutes to 300° C. for 30 minutes. The results are shown in Table 6.

EXAMPLE 37

A glass plate of 10 cm × 10 cm (thickness: 3 mm) was dipped in treating agent 16 and withdrawn therefrom at a rate of 11 cm/min to obtain a sample test piece. This test piece was evaluated, and the results are shown in Table 6.

TABLE 6

| | Dropping angle Initial stage | Waterdrop removal property | | | |
|---|---|---|---|---|---|
| | | Initial stage | Abrasion resistance 3 | Weather resistance | Boiling |
| Example 28 | 57 | A | A | B | B |
| Example 29 | 60 | A | A | A | A |
| Example 30 | 58 | A | A | A | B |
| Example 31 | 62 | A | A | A | B |
| Example 32 | 55 | A | A | B | B |
| Example 33 | 61 | A | A | A | A |
| Example 34 | 59 | A | A | A | B |
| Example 35 | 61 | A | A | A | B |
| Example 36 | 60 | A | B | B | B |
| Example 37 | 60 | B | B | C | D |

EXAMPLE 38

The test piece obtained in Example 30 was dipped in the reagent as identified in Table 7 for 24 hours, and it was withdrawn and immediately cleaned. Then, the change of the outer appearance and the water drop removal property of this test piece were confirmed. The results are shown in Table 7.

TABLE 7

| Reagent | Change of the outer appearance | Waterdrop removal property |
|---|---|---|
| Methanol | No change | A |
| Acetone | No change | A |
| Toluene | No change | A |
| Water | No change | A |
| 1% sulfuric acid aqueous solution | No change | A |
| 1% sodium hydroxide aqueous solution | No change | A |
| Commericially available cleaning agent | No change | A |
| Carbon tetrachloride | No change | A |
| Gasoline | No change | A |

EXAMPLE 39

Coating on the surface of a laminated front glass for an automobile was conducted in the same manner as in Example 30 to form a coating film. The laminated front glass thus obtained was mounted on an automobile. This automobile was subjected to a running test for 4 hours every day for one month, and the deposition of dust or stain on the surface of the front glass, or in a rainy day, the deposition of water drops, was visually observed every day.

As a result, no deposition of dust or stain, or no formation of fur due to deposition of water drops, was observed, or even if observed, it was readily removed by gently wiping it off with a tissue paper. Further, at the time of rain, water drops on the surface were repelled and readily moved away by the interaction with the wind pressure due to running, whereby the viewing field was secured without using a wiper. Further, in a running test in an environment (0° C. to −5° C.) where water drops deposited on a non-treated laminated front glass would freeze, or moisture in air would condense to form frost on a front glass, no formation of frost on the front glass was observed.

In a severer low temperature environment (−10° C. to −15° C.), formation of frost on the front glass was observed, but defrosting was quick and there was a substantial difference as compared with the non-treated front glass.

EXAMPLE 40

A running test was conducted in the same manner as in Example 39 except that the laminated front glass in Example 39 was changed to a side glass or a rear glass, whereby the same effects as in Example 39 were confirmed.

EXAMPLE 41

A running test was conducted in the same manner as in Example 39 except that the laminated front glass in Example 39 was changed to a side mirror, whereby the same effects as in Example 39 were confirmed.

EXAMPLE 42

Coating of treating agents on the surface of a glass plate for building was conducted in the same manner as in Example 30 to form two layers of coating films. The glass plate for building thus obtained, was mounted on a building. This window glass was subjected to an exposure test for one month, and the deposition of dust or stain on the surface of the window glass, or in a rainy day, the deposition of water drops, was visually observed every day.

As a result, no deposition of dust or stain, or no formation of fur due to deposition of water drops, was observed, or even if observed, it was readily removed by gently wiping it off with a tissue paper. The cleaning operation of the window glass was substantially simplified. Further, at the time of rain, water drops on the surface were repelled, and no spread of water was observed, whereby the viewing field was easily secured. Further, in a rainy day with a strong wind, water drops were readily moved away by the interaction with the wind pressure, whereby the viewing field was more readily secured.

Further, in an exposure test in an environment (0° C. to −5° C.) where water drops deposited on a non-treated window glass would freeze, or moisture in air would condense to form frost on a window glass, no formation of frost on the surface of the window glass was observed. In a severer low temperature environment (−10° C. to −15° C.), formation of frost on the window glass was observed, but defrosting due to a temperature rise was quick, and there was a substantial difference as compared with the non-treated window glass.

EXAMPLE 43

A exposure test was conducted in the same manner as in Example 42 except that the glass plate for building in Example 42 was changed to a heat-ray reflection glass plate for building ("Sun Lux SS8", manufactured by Asahi Glass Company Ltd.) As a result, the same effects as in Example 42 were confirmed.

EXAMPLE 44

With respect to test pieces prepared in Examples 1, 5, 7, 9, 19, 29, 32, 35 and Comparative Example 1, the following evaluation of the abrasion resistance was conducted, and the results are shown in Table 8.

Abrasion resistance

Tester: Reciprocation-type scratch tester (manufactured by K.N.T. K.K.).

Testing conditions: A flannel cloth was reciprocated under a load of 1 kg, and the number of reciprocations where the contact angle of water was maintained to be 90°, was examined.

TABLE 8

| | Number of reciprocations |
|---|---|
| Example 1 | 15,000 |
| Example 5 | 33,000 |
| Example 7 | 25,000 |
| Example 9 | 15,000 |
| Example 19 | 10,000 |
| Example 29 | 28,000 |
| Example 32 | 15,000 |
| Example 35 | 18,000 |
| Comparative Example 1 | 5,000 |

The substrate of the invention or an article having the substrate mounted, exhibits excellent effects as is evident from the foregoing Examples. Namely:

1. It is excellent in the water drop removal property and is free from deposition of dust, stain or water drops, or free from formation of fur due to such deposition, or even when formed, such fur can readily be removed, whereby adverse effects which may otherwise be induced by water can be prevented, and it is possible to simplify the cleaning operation.

2. It is excellent in maintaining the water drops removal property, and is capable of maintaining such a condition semi-permanently.

3. It is excellent in chemical resistance, and can be applied at a region along sea coast or at a region where sea water is directly in contact. Thus, it is applicable in wide range of fields.

4. It requires no special pretreatment, whereby the economical advantage is substantial.

Especially, it has a long lasting water drop removal property even at a normal temperature treatment.

5. The water drop removal property is most suitable for use in the field of transportation equipments and in the field of building and building decorations.

The above effects can not be expected with conventional materials, and the present invention is expected to be applied in an area where the conventional materials could not practically be used.

What is claimed is:

1. A surface-treated substrate consisting essentially of a substrate having at least two different treated surface layers wherein the first layer constituting the outermost layer among the treated surface layers is a layer obtained by treatment with a compound (I) containing at least one Si—NCO group capable of forming a surface having a contact angle of at least 70° against water, and the second layer constituting an underlayer in contact with the outermost layer is a layer obtained by treatment with at least one reactive silane compound (II) selected from the group consisting of isocyanate silane compounds and hydrolyzable silane compounds.

2. The substrate according to claim 1, wherein the substrate is made of glass.

3. The substrate according to claim 1, wherein the substrate is a part for a transportation equipment.

4. The substrate according to claim 1, wherein the substrate is a part for a building material or building decoration.

5. The substrate according to claim 1, wherein the compound (I) is a reactive silane compound of the following formula (A) or (B) wherein at least one organic group is a polyfluoroorganic group:

$$(Z)_{3-a-b}(R^1)_a(R^2)_b Si-Y-Si(R^3)_c(R^4)_d(Z)_{3-c-d} \quad (A)$$

wherein each of $R^1$, $R^2$, $R^3$ and $R^4$ which are independent of one another, is hydrogen or a $C_{1-21}$ organic group, Y is a bivalent organic group, Z is an isocyanate group or a hydrolyzable group, each of a and b which are independent of each other, is an integer of 0, 1 or 2, provided $0 \leq a+b \leq 2$, an each of c and d which are independent of each other, is an integer of 0, 1 or 2, provided $0 \leq c+d \leq 2$, $$(R^5)_e(R^6)_g(R^7)_n Si(Z)_{4-e-g-h} \quad (B)$$

wherein each of $R^5$, $R^6$ and $R^7$ which are independent of one another, is hydrogen or a $C_{1-21}$ organic group, provided that at least one of $R^5$, $R^6$ and $R^7$ is an organic group, Z is an isocyanate group or a hydrolyzable group, and each of e, g and h which are independent of one another, is an integer of 0, 1 or 2, provided $1 \leq e+g+h \leq 3$, each of reactive silane compound of the formula (A) and (B) containing at least one Si—NCO group.

6. The substrate according to claim 5, wherein the polyfluoroorganic group is an organic group having a $C_{3-21}$ perfluoroalkyl moiety or a $C_{2-16}$ perfluoroalkylene moiety.

7. The substrate according to claim 5, wherein the hydrolyzable group is a hydrolyzable group selected from the group consisting of a halogen atom, an alkoxy group, an acyloxy group, an alkoxy-substituted alkoxy group, an aminoxy group, an amide group, an acid amide group and a ketoxymate group.

8. The substrate according to claim 1, wherein the compound (I) is an isocyanate silane compound having at least one polyfluoroorganic group.

9. The substrate according to claim 1, wherein the reactive silane compound (II) is a compound selected from the group consisting of a compound of the following formula (A), a compound of the following formula (B) and a compound of the formula (B) wherein e+g+h is 0:

$$(Z)_{3-a-b}(R^1)_a(R^2)_b Si-Y-Si(R^3)_c(R^4)_d(Z)_{3-c-d} \quad (A)$$

wherein each of $R^1$, $R^2$, $R^3$ and $R^4$ which are independent of one another, is hydrogen or a $C_{1-21}$ organic group, Y is a bivalent organic group, Z is an isocyanate group or a hydrolyzable group, each of a and b which are independent of each other, is an integer of 0, 1 or 2, provided $0 \leq a+b \leq 2$, and each of c and d which are independent of each other, is an integer of 0, 1 or 2, provided $0 \leq c+d \leq 2$, $$(R^5)_e(R^6)_g(R^7)_h Si(Z)_{4-e-g-h} \quad (B)$$

wherein each of $R^5$, $R^6$ and $R^7$ which are independent of one another, is hydrogen or a $C_{1-21}$ organic group, provided that at least one of $R^5$, $R^6$ and $R^7$ is an organic group, Z is an isocyanate group or a hydrolyzable group, and each of e, g and h which are independent of one another, is an integer of 0, 1 or 2, provided $1 \leq e+g+h \leq 3$.

10. The substrate according to claim 9, wherein the hydrolyzable group is a hydrolyzable group selected from the group consisting of a halogen atom, an alkoxy group, an acyloxy group, an alkoxy-substituted alkoxy group, an aminoxy group, an amide group, an acid amide group and a ketoxymate group.

11. The substrate according to claim 1, wherein the reactive silane compound (II) is a reactive silane compound having no polyfluoroorganic group.

12. The substrate according to claim 1, wherein the reactive silane compound (II) is an isocyanate silane compound.

13. The substrate according to claim 1, wherein the compound (I) is an isocyanate silane compound having at least one polyfluoroorganic group, and the reactive silane compound (II) is an isocyanate silane compound having no polyfluoroorganic group.

14. The substrate according to claim 13, wherein the isocyanate silane compound having no polyfluoroorganic group, is tetraisocyanate silane.

15. The substrate according to claim 1, wherein the compound (I) is an isocyanate silane compound having a polyfluoroorganic group, and the reactive silane compound (II) is a hydrolyzable silane compound.

16. The substrate according to claim 15, wherein the hydrolyzable silane compound is a hydrolyzable silane compound having no polyfluoroorganic group.

17. The substrate according to claim 1, wherein the first layer is a layer obtained by treatment with a composition comprising the compound (I) and an organopolysiloxane.

18. The substrate according to claim 17, wherein the organopolysiloxane is an organopolysiloxane having repeating units of the following formula (C) and a viscosity of from 0.5 to 1,000 centistrokes at 25° C.:

$$[-SiR^8(CH_3)-O-] \quad (C)$$

wherein $R^8$ is a monovalent $C_{1-16}$ organic group.

19. The substrate according to claim 1, wherein the treated surface layers are prepared in such a manner that the substrate surface is treated with a compound containing an isocyanate silane compound (II) to form the second layer, and then the second layer surface is treated with a composition containing the compound (I) to form the outermost layer.

20. A surface-treated substrate having a treated surface layer formed by treatment with an isocyanate silane compound having at least one polyfluoroorganic group.

* * * * *